INTERMEDIATE MAGNETIC CORE STORAGE

Filed Jan. 2, 1953 5 Sheets-Sheet 1

INVENTORS
EDWARD J. RABENDA
GORDON E. WHITNEY

BY W. V. Schelberg
AGENT

INVENTORS
EDWARD J. RABENDA
GORDON E. WHITNEY

BY W. V. Schelberg
AGENT

INTERMEDIATE MAGNETIC CORE STORAGE

INVENTORS
EDWARD J. RABENDA
GORDON E. WHITNEY

BY W. V. Schelberg
AGENT

June 12, 1956 E. J. RABENDA ET AL 2,750,580

INTERMEDIATE MAGNETIC CORE STORAGE

Filed Jan. 2, 1953 5 Sheets-Sheet 4

CARD FEED UNIT TIMING CHART

INVENTORS
EDWARD J. RABENDA
GORDON E. WHITNEY

BY W. V. Schelberg
AGENT

June 12, 1956 E. J. RABENDA ET AL 2,750,580

INTERMEDIATE MAGNETIC CORE STORAGE

Filed Jan. 2, 1953 5 Sheets-Sheet 5

INVENTORS
EDWARD J. RABENDA
GORDON E. WHITNEY

BY W. V. Schelberg
AGENT

United States Patent Office 2,750,580

Patented June 12, 1956

2,750,580

INTERMEDIATE MAGNETIC CORE STORAGE

Edward J. Rabenda and Gordon E. Whitney, Poughkeepsie, N. Y., assignors to International Business Machines Corporation, New York, N. Y., a corporation of New York Application January 2, 1953, Serial No. 329,432

14 Claims. (Cl. 340—174)

The present invention relates to accounting machines and more particularly to machines adapted to read information from record cards into a storage device and thereafter to read the information from the storage device as many times as desired to an indicating device.

The storage system basically is an improvement over the system shown in the co-pending application for United States Letters Patent Serial No. 329,410, which was filed January 2, 1953, on behalf of Gordon E. Whitney. The improvements made in the storage system provide for greater reliability of operation and allow a wider fluctuation of controlling voltages employed in the system without faulty operation.

The principal object of the invention, therefore, is to provide an improved intermediate magnetic core storage system of the type described in the above mentioned co-pending application.

A further object resides in an improved arrangement for reading out and simultaneously reentering information in the storage device so that it may be repeatedly read out and recorded in a series of duplicated records.

Another object resides in providing novel biasing of the magnetic core elements of the storage device to give improved reliability of operation.

A still further object is to provide an improved arrangement for resetting the storage device prior to reading in information from a record card.

Other objects will be pointed out in the following description and claims and illustrated in the accompanying drawings which disclose, by way of example, the principle of the invention and the best mode which has been contemplated of applying that principle.

In the drawings:

Figs. 1, 2 and 3 taken together constitute a schematic wiring diagram of the circuits and the mechanism for reading information into and out of storage devices.

Figure 1:
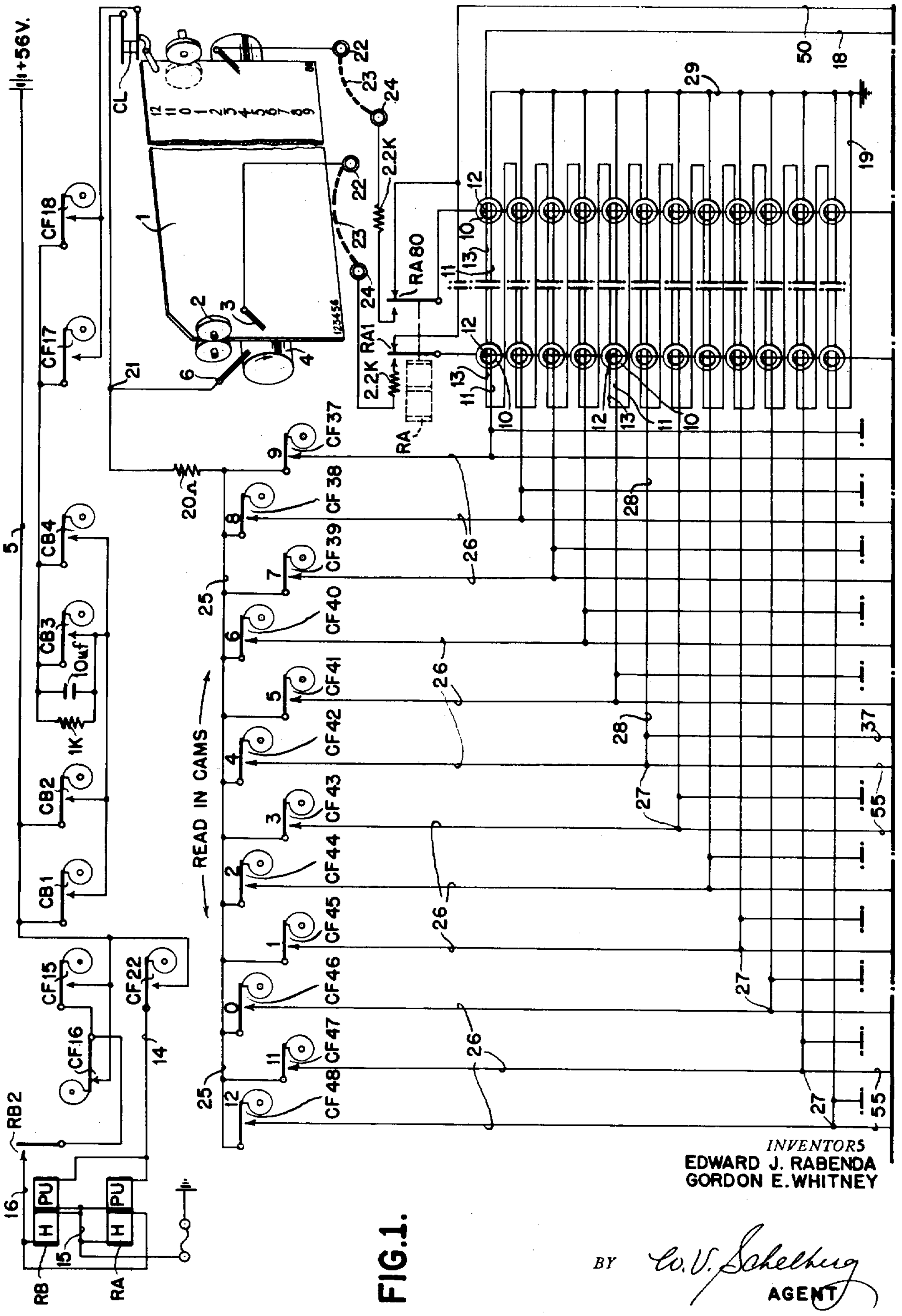

Referring to Fig. 1, it will be noted that a record card 1 of well-known type having a plurality of verticle columns with the usual ten digit representing positions designated 0 to 9 and two control positions designated 11 and 12, is advanced by feed rollers 2 past brushes 3. The cards are fed successively from the usual supply hopper (not shown) to the feed rollers which convey the cards with their 9's positions first past a row of the sensing brushes 3. A brush is provided for each column on the record card and the brushes are spaced laterally so as to sense concurrently like digit representing perforations in the different columns by making contact with a conductive roller element 4 through the perforations. The roller element is energized from a 56 volt line 5 through brush

Figure 5:
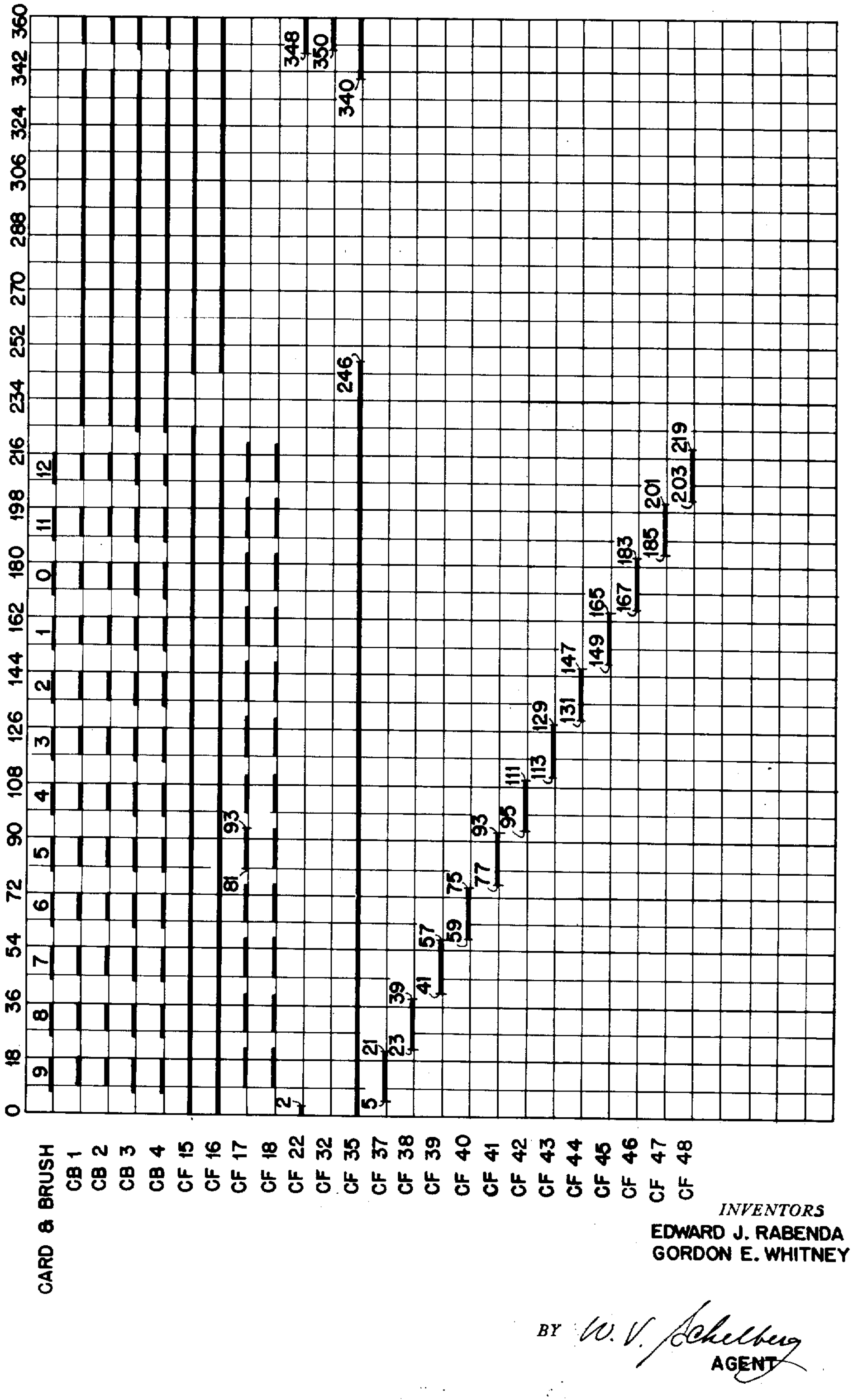
Fig. 5 is a timing diagram for the cam controlled switching devices associated with the record card sensing unit.

6 card lever contacts CL and series connected pairs of cam operated contacts CB1, CB2; CB3, CB4 and CF17, CF18. These cam contacts are driven with the card feed rollers 2 and are timed as shown in Fig. 5 in which the heavy lines indicate the intervals during which the contacts are closed. These cam contacts serve to close the circuit after the sensing brush 3 has made contact through a perforation in the record card and to open before the latter leaves a perforation in order to avoid the destructive effect of brush arcing at this point. Cam operated contacts CB3, CB4 are shown with the usual shunt connected resistor and capacitor elements serving to prevent arcing at these contacts on opening and reducing the current interrupting load of the cam operated contacts CF17—18 which open thereafter, as shown on the timing chart of Fig. 5.

The above described operation in which perforations in the record are sensed while the card is in continuous motion is termed flight sensing. During the flight of the card as one cycle is being completed, brushes 3 successively sense the digits in the 9 row, 8 row, 7 row, etc., through the 12 position. The cycle is divided into increments represented by the quarter inch distance between row positions of the card. Twelve increments or cycle points are required for sensing the card, and eight cycle points represented by the distance between cards are provided for restoration of components of the machine before sensing the following card. One cycle is then represented by the distance between the leading edges of successive cards. The cycle points are used as reference index means for timing component parts of the system and, as shown in Fig. 5, a complete card cycle is represented as 360°. It is noted for example, that the contacts CF17 and CF18, which make and break the brush sensing circuit, are operated twelve times in correlation with the twelve rows of perforations on the card and are synchronized to operate with contacts CB1, CB2, CB3 and CB4 as above described.

Information sensed from a record card in the above described manner is stored in a novel two dimensional magnetic core storage device from which the information may be later read out either once or repeatedly as will be later more fully described.

The storage device is illustrated in Fig. 1 and consists of a plurality of annular magnetic core elements 10 arranged in columns corresponding in number to the columns of the record, for example eighty, and having in each column a number of cores corresponding to the digit positions in each column, for example twelve. Columns 1 and 80 only are shown in the figure since the columns are identical to each other and it is desired to avoid unnecessary confusion and duplication. Each core is provided with three windings labeled 11, 12 and 13. Winding 11 consists of one turn passing through all of the cores representing similar digits in each column and is energized in timed sequence with the reading of the particular digit level in the record card. Winding 12 consists of a plurality of turns (for example fifty) passing through all the cores in a given column. Winding 13 consists of a single turn also embracing the cores in each column representing similar digits and is connected in series at each digit level row of cores for common energization of all the cores in a like direction.

Figures 3, 4:
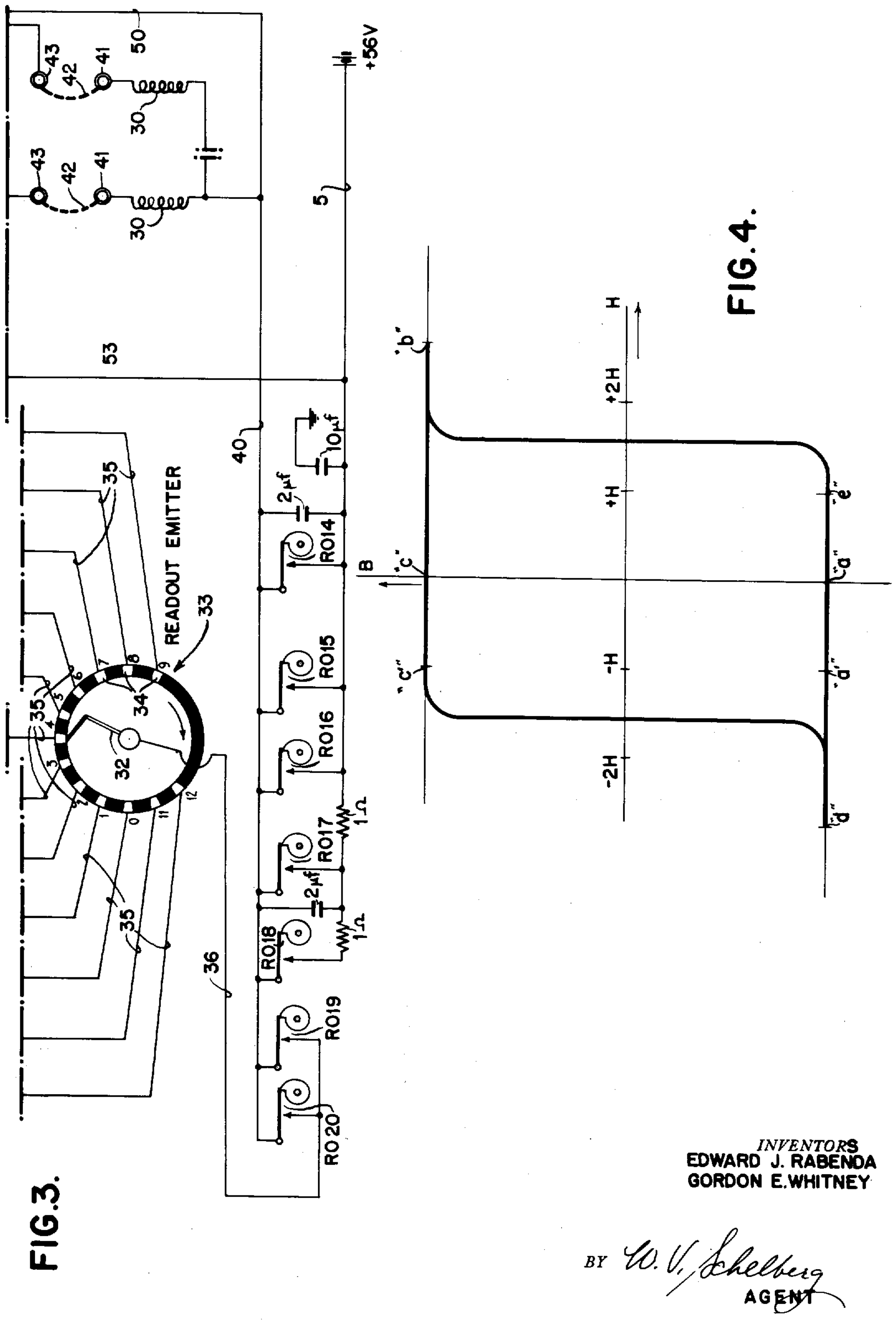
Fig. 4 is a diagram of the hysteresis characteristic of the magnetic cores of the storage device.

Magnetization of a core in one direction or remanance state is arbitrarily chosen as a "zero" condition and the reverse direction of magnetization is then taken as a "one." Referring now to Fig. 4, if the zero condition is taken as core remanance point "*a*," application of current sufficient to produce a magnetomotive force of +2H will cause the flux to traverse from remanance point "*a*" to saturation point "*b*," and, on removal of the current, to return to remanance point "c" at which state a "one" is represented. It is noted that application of a current sufficient to produce a force of +H will not effect the magnetic state of the core and, on removal of the +H mmf., the core would return to "zero." In like manner with a "one" stored, application of an mmf. of —2H will cause the core to traverse its hysteresis loop from point "c" to a point "a" while an mmf. of —H will leave the final remanance state unchanged.

The winding 13 constitutes a biasing winding providing sufficient ampere turns on all core elements to produce an mmf. of —H so that the "zero" point is transposed to the position "a'" as shown in Fig. 4, and an mmf. of +3H is now required to cause traversal to point "b'" which upon termination of the current will return to point "c'" representing a "one." While use of the bias increases the selection currents required for storage, an advantage is obtained in allowing 33⅓% variation in supply voltage without faulty operation. Windings 12 provide sufficient ampere turns when a perforation is sensed in a card to produce an mmf. of +H while windings 11 provide sufficient ampere turns to produce an mmf. of +2H in timed sequence with the passage of the card at each digit position as will be more fully explained in describing the operation of the unit as a whole.

Briefly, when a perforation is sensed, windings 11 and 12 acting additively produce an mmf. of +3H which is is sufficient to cause the core to reverse its state of remanance and store a "one." When a perforation is not present, winding 11 acting alone produces an mmf. of +2H and the point "a'" is transferred to point "e" and returns to point "a'" on termination of the current pulse and the core remains in a "zero" state.

Prior to read in of any information to the storage device, it is necessary to clear it of previously stored information or to reset the cores to a "zero" state of remanance. This is accomplished by energizing winding 13 to produce an mmf. of —2H in all the cores.

To reset the cores relays RA and RB, shown in Fig. 1, are initially energized by closure of cam operated contacts CF22. One terminal of the pick up windings PU of each of the relays RA and RB is connected through the contacts CF22 to the 56 volt line 5 via conductor 14. The other terminal of the pick up windings is connected to ground through lead 15. On picking up, contacts RB2 close and complete a circuit for hold windings H of each of the relays RA and RB through conductor 16 and cam contacts CF15—CF16 to the 56 volt line 5. Timing of the aforementioned cam contacts is shown in Fig. 5 where it will be noted that contacts CF22 close at 348° in the card feed cycle and open at 2° in the succeeding cycle. Contacts CF15 and CF16 close at 243° and remain closed until 225° in the succeeding cycle so that they are closed at the time contacts CF22 open in order to maintain the hold windings H of the relays RA and RB energized until completion of the card sensing operation, as will later be described.

As the relay RA is picked up in the above manner, contacts RA2 (Fig. 2) close and a circuit is completed from a 56 volt terminal, as shown, through the multiple parallel contacts RA2, a cam operated contact 32 which closes at 350° in the card feed cycle, the paralleled 50 ohm resistors, choke coil 17, lead 18, through each of the windings 13 in series to conductor 19 and to ground. Sufficient current flows through the above described path to return all the cores to a point "d" on their hysteresis characteristic curve and, on opening of contacts CF32 at 360° in the card feed cycle, they would return to the point "a." Cam contacts CF35 (Fig. 2), however, are closed at 340° in the card feed cycle and connect the windings 13 to the 56 volt terminal through an adjustable resistor 20, the choke coil 17 and conductor 18 so as to cause a current to flow through the windings 13 and produce an mmf. of —H in all the cores and they remain at a biased point "a'" for the read in period.

The storage device is now reset and prepared for storing the information sensed from a record card. The read in operation will be described for a "4" hole in column 1 for example, the procedure being identical for any other digit position in any column.

The brush 3 entering the "4" perforation, in the example taken, prepares a current path traced as follows: From the 56 volt line 5 through contacts CB1 and CB2, CB3 and CB4, CF17 and CF18, card lever contacts CL, terminal 21, brush 6, the conductive roller 4, brush 3 to hub 22 and through control panel wiring 23 to entry hub 24, the 2.2K resistor, contacts RA1 (normally open) of relay RA, winding 12 embracing the cores of column 1, contacts RB1 (normally open) of relay RB and thence to ground. Current of sufficient magnitude is thus caused to flow through the winding 12 of column 1 and an mmf. of +H is produced in the cores 10 of this column.

Read in cams CF37 through CF48 are provided as shown in Fig. 1 and operate in synchronism with movement of the record card 1 past the sensing brushes 3 in order to pulse the windings 11 at each digit level of the storage matrix at a time coincident with the sensing of the corresponding digit position on the record card. The timing of these contacts is illustrated in Fig. 5 where it is to be noted that each contact closes once in each cycle. At "4" time, the contact CF42 is closed simultaneously with passage of the "4" row position on the card past the brush 3. Closure of contact CF42 completes a circuit from the aforementioned terminal 21, through the 20 ohm resistor, line 25, contact CF42, a conductor 26, junction 27, lead 28, through windings 11 at the "4" digit level, and to ground through conductor 29. A current of sufficient magnitude to produce an mmf. of +2H in the cores 10 is thus caused to flow through the windings 11.

Coincident energization of windings 11 and 12 is sufficient to overcome the bias of winding 13 and the "4" digit level core of column 1 is caused to traverse its hysteresis loop from the "zero" point "a'" to the "one" point "c'." The "4" read from the record card is now stored and may be read out of the storage device at the leisure of the recording unit but before sensing the succeeding card by the reading unit. It is to be noted here that in the arrangement illustrated, the cards are fed "9" edge first and the 9 digit perforations in each column are sensed first and stored in the uppermost cores in each column of the matrix. It is obvious, however, that the storage order may be reversed with the 9 digit perforations, for example, stored in the lowermost cores if desired by adjusting the timing of the CF switches so as to pulse the windings 11 at the desired storage position coincident with reading of the particular row of perforations on the record card.

In reading out the stored information, a pulse is applied to the digit level windings 11 in a direction opposite to that of read in. The magnitude of the pulse is sufficient to cause the core in which a "one" has been stored to traverse its hysteresis loop and transfer to the "zero" remanance state. This flux change in the core induces a voltage in the winding 12 embracing the core, which voltage pulse is employed for operating the magnet 30 (Fig. 3) associated therewith in a manner to be described. By applying read out pulses to the digit level windings 11 at different times in a read out cycle, the magnets 30 may be energized at times representative of the information stored in the matrix.

Figure 2:
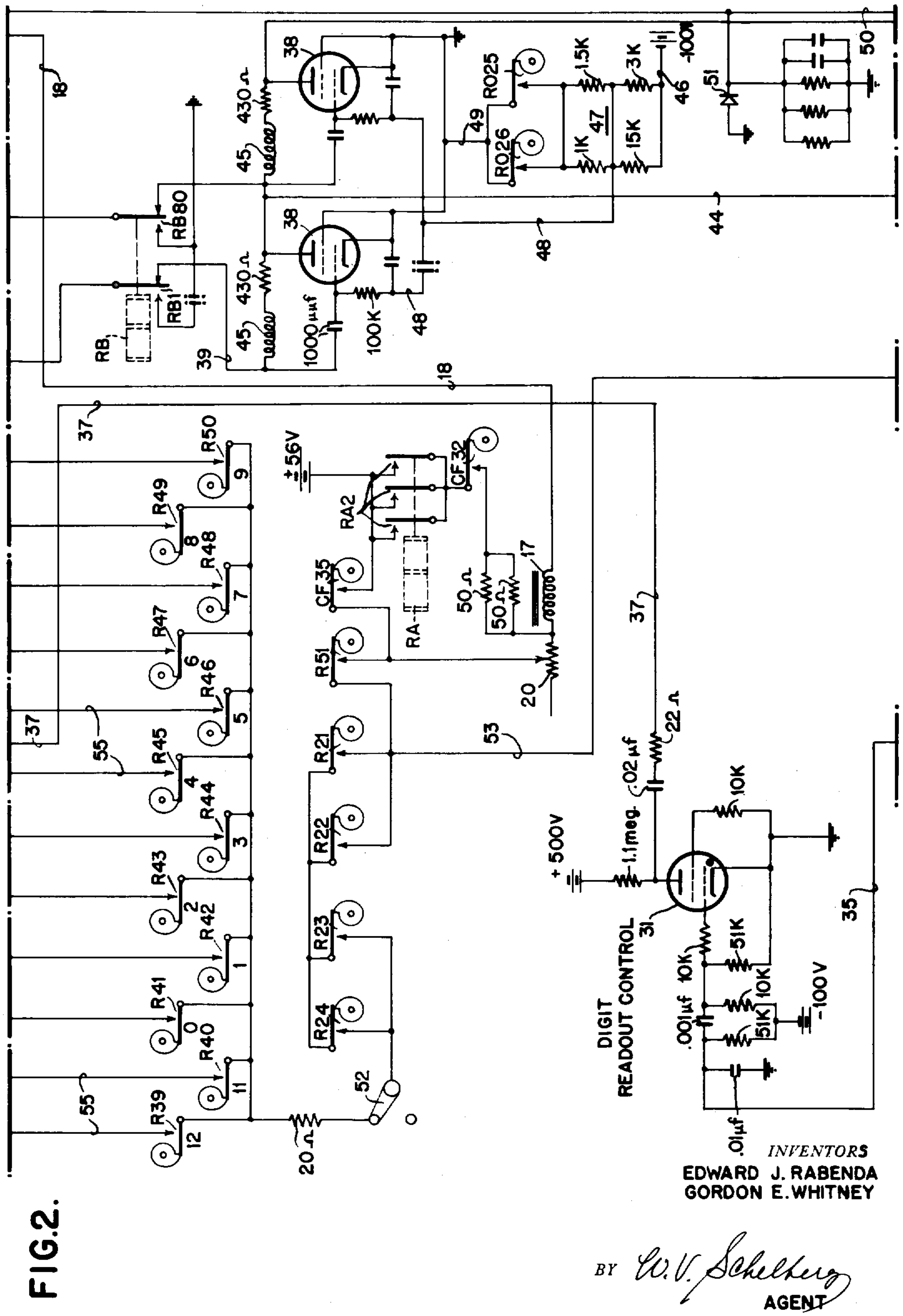

Read out is accomplished by firing a digit read out control tube 31 (Fig. 2) associated with the "4" digit level of the storage unit. Only one digit read out control unit is shown in Fig. 2 to avoid unnecessary duplication and confusion of the drawings, it being understood that similar units are provided for each digit level or a total of twelve such individual units. Cam controlled contacts of the read out unit close as indicated in the timing chart of Fig. 6 and are prefixed RO to distinguish them from the feed unit cam contacts labeled CF and CB. As shown in the chart timing reference is based on cycle points and the period of closure of the contacts RO is indicated by the heavy black lines. Contacts RO14 to RO20, for example, close twelve times corresponding to the 12 digit positions of a record card. Periodic closure of contacts RO14, RO15, RO19 and RO20 (Fig. 3) connect the brush arm 32 of the read out emitter 33 to the 56 volt source as shown. The read out emitter 33 is provided with contacts 34 numbered 9 to 0, 11 and 12 and connected by conductors 35 to the control grid circuit of the tube 31. Just after the 12 position on the card is read by the brushes 3 of the sensing unit, the contacts CF15 and CF16 open to deenergize the relays RA and RB. Contacts RA1, RA2, RB1 and RB2 return to their normal positions. The emitter brush 32 is driven to successively engage the contact segments 34 in synchronism with passage of a record card, on which the stored information is to be recorded, through the readout unit. The record card is fed through the readout unit, in the example shown, "12" edge first so that the emitter contact brush 32 is rotated clockwise to successively pulse the windings 11 of the storage matrix in proper sequence. It is obvious that the record cards may be fed through the read out unit, "9" edge first, reversing the rotation of contact brush 32 and, as will be later described, by adjusting the timing of contacts R39 to R50.

Figure 6:
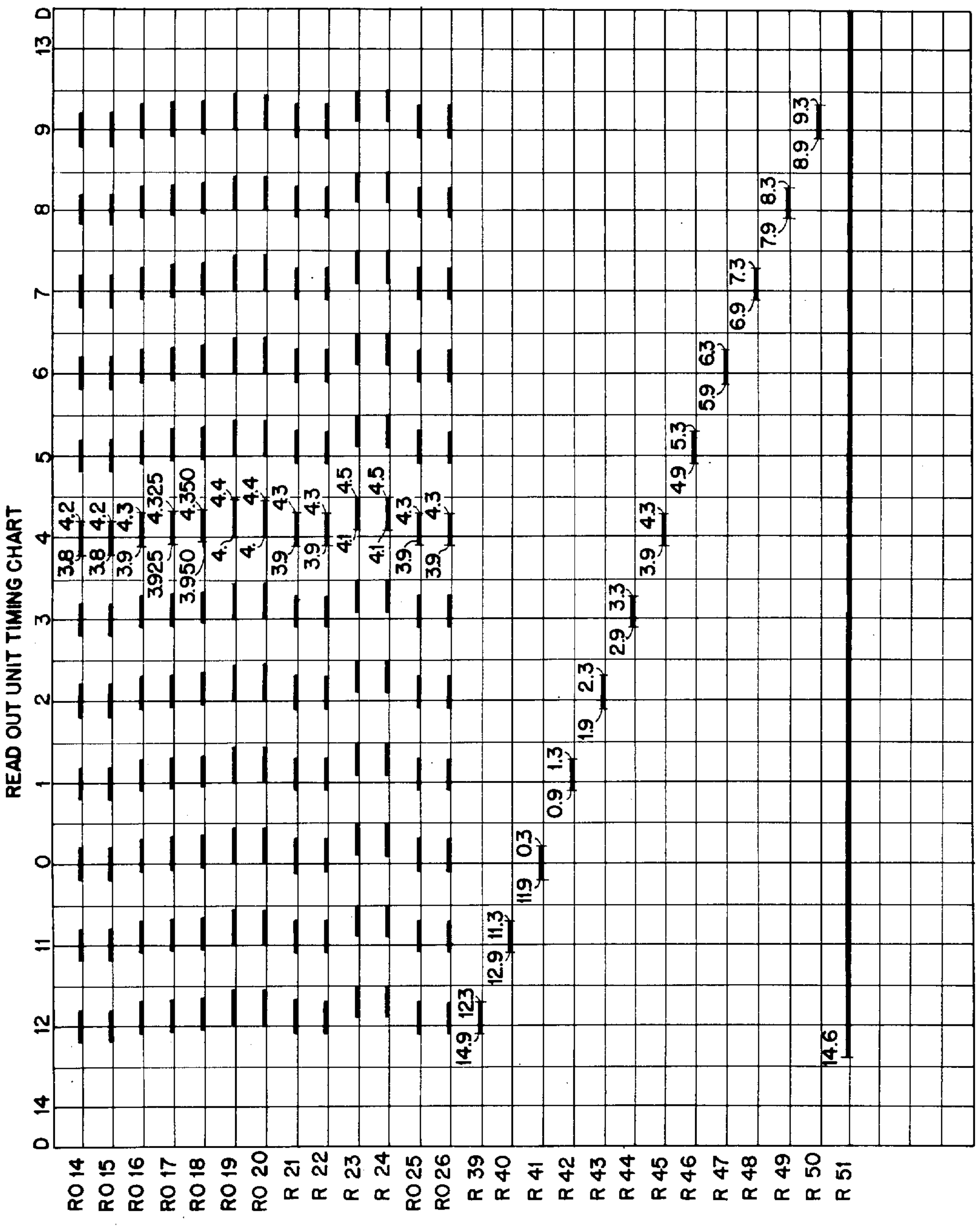
Fig. 6 is a timing diagram for the cam controlled switching devices associated with the indicating unit.

In reading out the "4" stored in the matrix as above described, the emitter brush arm 32 is in contact with contact 34 provided for the 4 digit and a circuit is completed from the 56 volt line 5 through contacts RO14, RO15, RO16, RO17, RO18 and RO20, closed as shown in Fig. 6, a conductor 36, emitter brush arm 32, segment 4, lead 35 and thence to the condenser coupled grid circuit of the digit read out control tube 31. The plate of tube 31 is energized from a +500 volt source as shown through a 1.1 megohm resistor. A .02 mf. condenser coupled to the plate circuit of the tube is normally charged to +500 volts. The pulse applied through the emitter 33 fires the tube and the .02 mf. condenser discharges through winding 11 at the 4 digit level through a circuit path traced as follows: From the plate side of the .02 mf. condenser through tube 31 to ground, through the grounded lead 29 connected to winding 11, through the winding 11 and lead 37, a 22 ohm resistor and back to the opposite terminal of the .02 mf. condenser. Thyratron 31 is now cut off as the transient current from the capacitor is dissipated since the 1.1 megohm resistor limits the flow of current from the 500 volt plate supply to a value insufficient to maintain conduction.

The read out pulse is applied to winding 11 in a direction opposite to that of read in and an mmf. is produced thereby causing the core 10 in which a "one" has been stored to traverse its hysteresis loop from "*c'*" to "*d*" (see Fig. 4) and, when the pulse is dissipated, returns to point "*a'*." Other cores in the 4 digit level of other columns without stored information will be unaffected by the read out pulse. The flux reversal in the core in question induces a voltage in winding 12 which is applied to the grid of a tube 38 through the normally closed contacts RB1, lead 39 and a 1000 mmf. condenser. Closure of contacts RO14 and RO15 at the beginning of the read out operation completes a circuit from the 56 volt terminal to lead 40 to which one terminal of each of the eighty magnet coils 30 is connected. The other terminal of each of the coils 30 is coupled through a hub 41, control panel wiring 42, a hub 43, and a conductor 44 to the plate of one of the tubes 38. Only the tubes 38 and associated elements for columns 1 and 80 are illustrated for simplification as the arrangement for each is identical. The plate of tube 38 is coupled to its grid through a 430 ohm resistor and a choke coil 45. In order to prevent the tube 38 from firing on application of plate potential, its grid is biased to −100 volts applied from conductor 46 through the paralleled 15K and 3K resistor elements of the resistor bridge 47, through lead 48 and a 100K resistor coupled to the grid. Closure of contacts RO25 and RO26 at an interval after application of plate potential connects the other terminal of the bridge 47 to ground via lead 49, and a bias voltage of approximately −19 volts is thereafter maintained on the grid during the read out cycle. The high frequency pulse induced in winding 12 and applied to the grid through the normally closed contacts RB1 through conductor 39 will not pass choke coil 45 and the 430 ohm resistor but overcomes the −19 volts bias and the tube 38 fires. The magnets 30 and winding 12 are thereby connected in parallel across the 56 volt source. The circuit through winding 12 may be traced from conductor 40 (Fig. 3), lead 50, normally closed contacts RA1 (Fig. 1), windings 12, the normally closed contacts RB1, lead 39, the choke coil 45, the 430 ohm resistor and to the plate of tube 38. It is noticed at this point that the direction of current flow through winding 12 is in the same direction as for read in and comparable in magnitude to a sensing pulse. The circuit, including the magnet 30, may be traced from the conductor 40, magnet 30, hub 41, control panel wiring 42, hub 43 and through the conductor 44 to the plate of the tube 38.

The firing of tube 38 completes this circuit from line 40 through the magnet 30 and the tube 38 to ground and the magnet is energized to record the information that has been stored. Following this function, the cam contacts RO14—RO18 open to disconnect the plate voltage supply and extinguish the thyratron 38 in preparation for functioning of the machine to read out and record information stored in the next succeeding digit level of the matrix. The polarity trap 51 (Fig. 2) functions to provide a path for current caused to flow by the back mmf. of the magnet 30 during this period and to prevent this reverse flow of current from traversing the windings 12 in a reverse direction.

Should it be desired to record the information read from a single card onto a plurality of other cards, the system is caused to restore the information in the storage matrix after it has been read out. To effect this operation, a read back switch 52 (Fig. 2) is closed and pairs of make and break restore cam switches R21—R22 and R23—R24 are caused to close prior to opening of contacts RO14—RO18 which cut off the thyratron 38 as described above. A circuit is completed from the 56 volt line 5 shown in Fig. 3, through the conductor 53, the switches R21—R24, read back switch 52, a 20 ohm resistor and to the conductor 54. Twelve cam operated switches R39 to R50, one provided for each digit level, are coupled at the cam side to conductor 54 and close for periods as shown in the timing diagram, Fig. 6. The contact sides of these switches are coupled to the contact sides of the read in cam switches CF37—CF48 through leads 55 which connect with the terminals 27. For the example taken, at 4 time in the recording cycle, switch R45 closes and conductor 54, now raised to a potential of +56 volts as above described, is connected through lead 55 associated therewith to junction 27. Current now flows through the 4 digit level winding 11 via lead 28 to grounded conductor 29. Current flowing through winding 12 and conducting thyratron 38 as heretofore described now is applied in conjunction with that flowing through winding 11 and jointly produce an mmf. of sufficient magnitude to overcome the negative bias of windings 13 and the core in question is returned to its stored state of magnetization. During the recording cycle, winding 13 is energized from the 56 volt line through lead 53 and cam contacts R51 through a path including resistor 20 and choke 17 as previously employed in the card reading feed cycle through the contacts CF35.

Each time the information stored in the cores is read out it is read back into storage and the read out operation can be repeated as many times as desired or until either the read back switch 52 is opened or a second card is fed into the card feed unit, whereby the previously described resetting or zeroizing function will occur.

While there have been shown and described, the fundamental novel features of the invention as applied to a preferred embodiment, it will be understood that various omissions, substitutions and changes may be made in the form and details of the device illustrated and in its operation without departing from the spirit of the invention. Particular values of circuit elements have been illustrated and described for purposes of clarification and explanation only and are not necessarily critical. It is the intention, therefore, to be limited only by the scope of the following claims.

What is claimed is:

1. A static binary storage device comprising a plurality of magnetic core elements having a substantially rectangular hysteresis characteristic, said cores being arranged in columns corresponding in number to the characters of information to be stored and with each column including cores corresponding in number to the values of the characters to be stored, a first set of windings individually common to all cores of each column, a second set of windings individually embracing like character representing cores of each column, a third winding uniformly embracing each of said cores, means for sequentially energizing said second windings during a read in period, means for selectively energizing said first windings during said read in period, and means for energizing said third winding to initially magnetize said cores to a datum direction and to thereafter continuously bias said cores toward said datum direction during said read in period.

2. A two dimensional magnetic core storage device comprising a plurality of core elements having a substantially rectangular hysteresis characteristic, said cores being arranged in N columns of M cores, first windings embracing the cores in individual columns, second windings individually embracing the first through Mth row of cores in each column, third windings uniformly embracing each of said core elements, means for periodically energizing said second windings, means for selectively energizing said first windngs in synchronism with energization of said second windings, means for energizing said third windings to initially magnetize all said cores to a uniform state, read out means for sensing a changed state of magnetization in said core elements developed as a voltage induced in said first windings, and means controlled by said read out means for operation of a recording device.

3. Apparatus as in claim 2 including additional means for energizing said third windings to bias said cores in said initial uniform state.

4. Apparatus as set forth in claim 2 including read back means coupled with said first and second windings and adapted to restore said core elements individually to the states of magnetization existing therein prior to operation of said read out means.

5. A machine for manifesting data recorded on a record sheet by columns of perforations which represent different characters, sensing means comprising a sensing device for each column, means for relatively moving the record sheet and sensing means at a uniform rate to cause said sensing means to sense the respective columns concurrently, a storage unit including a plurality of magnetic core elements having a substantially rectangular hysteresis characteristic, one element being provided for each character in each column, a first set of windings embracing each column of elements, a second set of windings embracing elements of each column representing like characters, third windings uniformly embracing all core elements of the storage unit, means connecting said first set of windings and corresponding column sensing means, means for periodically energizing said second set of windings at each character level concurrently with sensing of the like character level of the record, coincident energization of said first and second windings causing a change in the state of magnetization of core elements, means for energizing said third windings and initially magnetizing said cores to a uniform state and for thereafter biasing said cores to mantain said initial state, read out means coupled with said second set of windings for periodically energizing said windings in a direction contrary to read in, means coupled with said first set of windings for detecting a change in the state of magnetization of said cores and means controlled by said read out means for operating a recording device.

6. A machine for manifesting data recorded on a record sheet by columns of perforations which represent different characters, sensing means comprising a sensing device for each column, means for relatively moving the record sheet and sensing means at a uniform rate to cause said sensing means to sense the respective columns concurrently, a storage unit including a plurality of magnetic core elements having a substantially rectangular hysteresis characteristic, one element being provided for each character in each column, a first winding embracing each column of elements, second windings embracing elements of each column representing like characters, third windings uniformly embracing all core elements of the storage unit, means connecting said first windings and corresponding column sensing means, read in means operable to energize said second windings at each character level concurrently with sensing of the like character representing position on the record, coincident energization of said first and second windings causing a change in the state of magnetization of said core elements, means for energizing said third windings and initially magnetizing all said cores to a uniform state and for thereafter biasing said cores to maintain said initial state, read out means for periodically energizing said second windings, means coupled with said first windings for sensing a changed state of magnetization in said core elements, manifesting units for each column of characters and means controlled by said latter means for operating said manifesting units.

7. The apparatus set forth in claim 6 including read back means for restoring each of said core elements to the state of magnetization attained prior to operation of said read out means.

8. The apparatus set forth in claim 7 in which said read back means includes means for energizing said second windings in the direction of read in current flow and means coupled with said first windings causing current flow in a read in direction in response to functioning of said read out means.

9. A machine for manifesting data recorded on a record sheet by columns of perforations which represent different characters, sensing means comprising a sensing device for each column, means for relatively moving the record sheet and sensing means at a uniform rate to cause said sensing means to sense the respective columns concurrently, a storage unit including a plurality of magnetic core elements having a substantially rectangular hysteresis characteristic, one element being provided for each character in each column, a first winding embracing each column of elements, second windings embracing elements of each column representing like characters, a third winding embracing all core elements of the storage unit, means connecting said first windings and corresponding column sensing means, read in switching means comprising a series of cam operated contacts operable in timed sequence with the movement of the record card and connected with said second windings so as to periodically energize said second windings at each character level concurrently with sensing of the like character level of the record, coincident energization of said first and second windings causing a change in the state of magnetization of the core elements, means for energizing said third winding and initially magnetizing all said cores to a uniform state and for thereafter biasing said cores to maintain said initial state, a manifesting unit including a plurality of operating magnets, one operating magnet being provided for each column of the storage device, read out means including group of contacts operable in synchronism with said manifesting unit for periodically energizing said second windings causing those cores in which a changed magnetic state exists to again reverse their magnetic state thereby causing a voltage to be induced in the first winding embracing said cores, means including a thyratron coupled with said first windings and rendered conductive in response to said induced voltage and circuit means connecting said operating magnets in series with said thyratrons.

10. Apparatus set forth in claim 9 wherein said first windings and said operating magnets are connected in parallel and in series with said thyratrons and additional means for periodically energizing said second windings in a read in direction in synchronism with said manifesting unit, coincident energization restoring said cores to the state of magnetization attained prior to operation of said read out means.

11. A device for storing information sensed at index points arranged in columns on a card comprising, in combination, a plurality of magnetic core elements having a substantially rectangular hysteresis characteristic, one for each index point, arranged in columns corresponding to said card columns, said cores being magnetizable in one direction to represent a binary "zero" and magnetizable in the opposite direction to represent a binary "one," a first set of windings individually embracing each column of cores, a second set of windings individually embracing cores at corresponding positions in said columns, a third set of windings arranged on each of said cores in a uniform manner and connected in series, sensing means engageable successively with the card index points in each column and operating on sensing information at any point for energizing the windings of said first set of windings embracing the column of cores corresponding to the card column in which the information was sensed, and means for energizing the windings of said second set successively and in synchronism with the engagement of said sensing means with index points at corresponding positions on said card, means for energizing said series connected third windings to initially establish a "zero" state of magnetization in each of said cores and for energizing said third windings thereafter during the sensing period, each of said cores being magnetized in a direction to represent a binary "one" when both of the windings embracing it in said first and second sets are energized.

12. Apparatus as set forth in claim 11 including read out means comprising an emitter operable to pulse said second windings at each digit level concurrently with the passage of a record card through a recording unit and causing those cores in which a "one" is stored to reverse their magnetic state, means for sensing a voltage impulse induced in said first winding and for energizing an operating magnet provided for each of said windings.

13. Apparatus as in claim 12 wherein said means for sensing a voltage impulse induced in said first windings includes a thyratron coupled with said first winding and rendered conductive in response to said induced voltage, circuit means connecting said operating magnets and said thyratrons in series, further means connecting said operating magnets and corresponding ones of said first set of windings in parallel and means including cam operated contacts provided at each digit level for successively pulsing said second set of windings at each digit level in a direction contrary to that accomplished by said emitter whereby those core elements in which a "one" had been stored are returned to their stored state of magnetic remanance.

14. A static binary storage device comprising a magnetic core having a substantially rectangular hysteresis characteristic; first, second and third winding means embracing said core; read in means for selectively energizing said first winding with a unidirectional current pulse effective to produce a magnetomotive force less than the coercive threshold of said core during a read in interval; means for periodically energizing said second winding with a current pulse additive with respect to that applied to said first winding by said read in means and of twice the magnitude so as to produce a magnetomotive force greater than the threshold coercive force; and means for energizing said third winding means with a current in a direction opposite to that applied to said first winding means and of equal magnitude during said read in interval.

References Cited in the file of this patent

UNITED STATES PATENTS 2,696,600 Serrell ---------------- Dec. 7, 1954

OTHER REFERENCES

Thesis by K. H. Olsen, "A magnetic matrix switch and its incorporation into a coincident-current memory," M. I. T., pp. 41, 46–54, June 6, 1952.

Thesis by M. K. Haynes, "Magnetic cores as elements of digital computing systems," December 1950, pp. 21–28.

Publication, Proc. Assoc. Comp. Mach., May 1952, pp. 213–222.

Digital Information Storage etc. by J. W. Forrester, Journal of Applied Physics, vol. 22, No. 1; pages 44–48, January 1951.

A Coincident Current Magnetic Memory, by W. N. Papian, Proceedings of the IRE, April 1952; pages 475–478.

Static Magnetic Matrix Memory etc., by J. A. Rajman, RCA Review for June 1952; pages 183–201.

Static Magnetic Memory etc. by An Wang, Proceeding of the Assoc. of Computing Machinery, May 1952; pages 207–212.